United States Patent Office 2,875,065
Patented Feb. 24, 1959

2,875,065
FLUID SHORTENING COMPOSITION

Stuart W. Thompson, Upper Saddle River, N. J., assignor to Lever Brothers Company, New York, N. Y., a corporation of Maine No Drawing. Application May 11, 1955
Serial No. 507,727

20 Claims. (Cl. 99—118)

This invention relates to a shortening composition for use in baking and frying and to methods of making it, and relates specifically to stable fluid shortening compositions which will produce high volume cakes, having tender crust, even, close grain, and soft texture, and to the preparation of such shortenings.

Shortenings heretofore available for baking have included natural fats which are solid or plastic at room temperatures, including fatty animal tissues, butter, and lard; compounded or blended shortenings, made from mixtures of naturally hard fats or hydrogenated vegetable oils with liquid, soft, or partially hydrogenated vegetable oils; all-hydrogenated shortenings made by selectively hydrogenating a blend of liquid vegetable oils to obtain the desired finished properties; and superglycerinated shortenings which are generally all-hydrogenated shortenings containing an increased proportion of combined glycerol, in the form of mono- and diglycerides, over that found in ordinary fats.

Liquid oils such as cottonseed, soybean, olive, rapeseed, corn oil, and sunflower seed oil may be treated by a "winterizing" process, known in the prior art and described hereinafter to remove ingredients which tend to precipitate and settle out at low temperatures and sometimes cause the oil to congeal. The materials so produced are known as salad oils.

Recently liquid oils, particularly salad oils, have been recommended for the preparation of a particular variety of cakes, but such oils are not suitable for the preparation of conventional high volume cakes containing a high ratio of sugar to flour. Cakes of this type, having an even, close grain, a tender crust and a soft texture are in the greatest demand among consumers whether home baked or commercially prepared. These qualities are attainable to the highest degree with all-hydrogenated superglycerinated plastic shortenings.

The superior performance of plastic shortenings in cake making results to a large degree from their ability to entrap and hold considerable quantities of air during the mixing of batters and doughs. This air contributes leavening action in the baking process. This trapping of air by fats in mixing batters and doughs is referred to as creaming. Liquid shortenings such as salad oils heretofore available do not have good creaming action.

Superglycerinated plastic shortenings are more efficient than other plastic shortenings in producing cakes having optimum properties due to the effectiveness of the mono- and diglycerides as emulsifiers which promote the thorough and fine dispersion of the fat in the batter, thus resulting in a high degree of dispersion of the desirable entrapped air.

Plastic shortenings have the disadvantage however that they are difficult to measure and consumers would welcome a liquid shortening which could be readily measured and poured provided it could approach or meet the cake-making performance of superglycerinated plastic shortcomings.

Liquid oils are known to disperse in batters and doughs in the form of spherical droplets which have less surface in contact with the other batter ingredients than do plastic shortenings which disperse in sheets and films. Thus even the addition of mono- and diglycerides to salad oils at levels which do not interfere with fluidity is of little value in improving the performance of salad oils and does not produce a shortening with cake-making performance equal to that of plastic superglycerinated shortenings.

Cake ingredients may be combined in any one of several ways. One of the oldest and perhaps most common is to first mix or "cream" the shortening and sugar, following by addition of eggs and then alternate portions of flour and milk, the salt and baking powder being with the flour. This is called the creaming method and is described in greater detail below.

The next most common method is to first mix the shortening and flour followed by the sugar and then the eggs and milk together. This is the so-called "blending" method, and is also described in greater detail below.

Other ingredient addition orders are possible but regardless of the mixing method it is necessary that the fat particles in the final batter (which is an oil in water type emulsion) shall contain small air bubbles. The volume of the final cake can be varied by the amount of baking powder added but unless these air bubbles of microscopic size are present in the fat phase of the batter, the cake will be coarse grained, tough crusted and hard textured.

When the creaming method is used the air bubbles in the batter are large and the batter volume, which is the reciprocal of the specific gravity, is high if the cake is to be good. When the blending method is used the air bubbles in the batter are smaller and the batter volume has less significance although some aeration of the batter in mixing is fully as important. Proper aeration of the batter is reflected in higher cake volumes. In the case of the creaming method there is a fairly good correlation between batter volume and cake volume. In the blending method, fineness rather than degree of aeration is most important and correlation between batter volume and cake colume is less significant. This function of air in batter fat is well known to the art and is discussed extensively in Alton E. Bailey, Industrial Oil and Fat Products, 2nd edition (1951), Interscience Publishers, at pages 295–304 and in an article by G. T. Carlin published in Cereal Chemistry, vol. 21, pages 189–199 (1944).

Different laboratories and bakeries vary considerably in their methods of expressing their judgments of cakes. Whatever evaluation method is used, the characteristics desirable in cakes are generally recognized in industry and in the home. Descriptions of cake scoring methods may be found, for example, in the article by O. E. Stamberg in Cereal Chemistry, vol. 16, page 764 (1939) and the article by F. Hanning in Cereal Chemistry, vol. 29, page 177 (1952). In this laboratory cakes are scored on the basis of crust, grain, and texture. Crust ratings are very tender, tender, medium tender, slightly tough, and tough. Grain ratings are even, very slightly uneven, slightly uneven and uneven, in any combination with open, slightly open, very slightly open, close, very slightly tight, slightly tight or tight. Texture ratings are soft, medium soft, medium hard and hard. An all-hydrogenated superglycerinated plastic vegetable shortening may be expected to yield a cake having a tender crust, an even close grain, and soft texture.

I have discovered that stable fluid shortening compositions which will produce cakes comparable to those produced with all-hydrogenated superglycerinated plastic shortenings can be prepared by incorporating in a liquid oil from 3 to 8% by weight, preferably from 4 to 6%, of one or more triglycerides having at least one behenyl ($C_{21}H_{43}COO-$) group per molecule. Certain advantages of the invention are obtained by using compositions in which the behenyl triglyceride component contains a major proportion of the monobehenyl triglyceride, as will appear hereinafter.

It will be apparent that the behenyl triglycerides employed according to the invention may be produced by hydrogenating erucic acid triglycerides. The fatty acids of mustard and rapeseed oils are nearly half erucic and most of the remainder are oleic, linoleic and linolenic acids. The glycerides resulting from hydrogenation of these oils consist predominantly of monobeheno distearo glyceride and dibeheno monostearo glyceride. Hydrogenated mustard and rapeseed oils therefore are a satisfactory source of behenyl triglycerides for invention purposes. Monoerucyl triglyceride, from which the preferred monobehenyl glyceride may be made may be separated from the oil by fractionation according to the method of Hilditch, Laurent and Meara, J. Soc. Chem. Ind. 66, 19 (1947), and subsequently hydrogenated.

The term "stearine" is commonly used to designate hydrogenated triglycerides and hence one embodiment of the invention comprises use of stearines obtained by hydrogenating to an iodine value of 30 or less, vegetable oils obtained from sources rich in erucic acid. I prefer to use for this purpose either rapeseed oil stearine or mustard seed oil stearine, or a combination of the two. The fluidity of the behenyl triglyceride composition is surprising, since the prior art has assumed that higher melting glycerides, of which the behenyl triglycerides employed according to the invention would be an example, are to be avoided in liquid oil products for consumer use due to the expectation that they would be unstable, i. e., would cause gelation and/or separation of solids on standing.

While it is known that certain vegetable oil stearines, namely those which have strong beta polymorphic crystalline phase forming tendencies, such as sunflower seed oil, linseed oil, hazelnut oil, soybean oil, peanut oil, olive oil, corn oil and lard, can be suspended in liquid oils to yield a relatively stable fluid product, these stearines are only very slightly effective in cake making. The behenyl triglycerides of this invention which are strong beta-prime formers when cooled by themselves, unexpectedly are effective in forming stable suspensions regardless of their crystal phase when cooling from a solution.

Any liquid vegetable oil may be used in the compositions of the invention including cottonseed, soybean, olive and peanut among others as well as slightly hydrogenated liquid variations thereof. In order to prepare fluids of improved stability, however, it is preferable to utilize a salad oil, i. e., an oil prepared by "winterizing" the liquid oil. This is particularly true in the case of cottonseed oil. The "winterizing" process is carried out by slowly cooling the oil under conditions which will allow the precipitation and clean separation of crystalline high melting glycerides, in order to prevent congealing of the salad oils upon refrigeration or exposure to low temperatures in shipment or storage. Even after winterization some settling frequently takes place. Corn oil, the other major source of salad oils, is preferably freed of its wax content to avoid possible settling at low temperatures. This settling may be unattractive to consumers.

Satisfactory dispersions of the behenyl triglycerides, e. g., erucic acid oil stearines, can be prepared by allowing a melt of the stearine-salad oil blend to cool at room temperature, whereupon the stearine crystallizes from solution in a very fine particle size. The particle size is preferably small enough so that the mixture is substantially non-settling. The formulations can be prepared by grinding the stearine with Dry Ice in a hammer mill and adding the powder to the liquid oil. The latter method yields somewhat stiffer but satisfactorily pourable compositions even though additional ingredients (mentioned hereinafter) are present; and if rapeseed oil stearines having iodine values close to 30 are used, their cake performance is also satisfactory but not quite as good as when the crystallization procedure is used. The crystallization from solution is therefore preferred.

Although as previously indicated mono- and diglyceride emulsifiers show little or no improvement in the cake-making performance of liquid oils, in combination with the compositions of this invention containing erucic acid oil stearines these emulsifiers yield a fluid shortening having cake making performance noticeably exceeding that of the same compositions without the emulsifiers. Monoglyceride and mono- and diglyceride emulsifiers are well known to those skilled in the art and are available from various suppliers. For the purposes of this invention I prefer the monoglycerides of saturated fatty acids. Lard stearine distilled monoglycerides are particularly suitable. An emulsifier of this type is available under the trade name "Myverol 18:00" (melting point 72.3° C.). I may also use emulsifiers which are mixed monoglycerides of the fatty acids of liquid oils such as cottonseed oil. An emulsifier of this type is commercially available under the trade name "Myverol 18:85" (melting point 52.7° C.). Sunflower seed oil mono- and diglyceride emulsifiers are also effective (melting point 39.5° C.). Whatever mono or mono- and diglyceride emulsifier is used it may be incorporated in the compositions of the invention at a level of from 0.5 to 5% by weight of the composition, depending on the emulsifier used. Generally, tolerance of the lower melting emulsifiers is greater. I prefer to use from 1 to 1.5%.

While the compositions of my invention containing from 3 to 8% by weight of behenyl triglyceride, e. g., erucic acid oil stearines, show good cake-making properties, the compositions having more than 5% of these stearines become somewhat thickened, though still pourable, on standing for periods of one week or more.

Beta phase soybean oil stearines alone yield compositions with no greater fluidity than the erucic acid oil stearines using equal proportions of up to 8% of each and have no cake improving properties. I have found however that the addition to my compositions comprising behenyl triglyceride, in particular erucic acid oil stearines, of 1 to 8% by weight of soybean oil stearines having an iodine value of 1 to 22 further increases the stability of the compositions without adversely affecting their cake making performance. These stearines may be powdered in a hammer mill with Dry Ice and then dispersed by mixing or they may be coarsely ground and then reduced in size by passing through a colloid mill with part of the salad oil ingredient and then added to the remainder of the composition.

Compositions having acceptable fluidity for purposes of the present invention are pourable at a temperature within room temperature range, i. e., 70–85° F. A convenient test of fluidity may be made by dropping a cone-tipped weight or "needle" through a portion of the material and noting the distance it falls during a standard time interval. The needle has a cone tip ¾ inch high and a base 1¼ inches in diameter. Above the cone base there is a continuing cylindrical section 2 inches long of the same diameter as the cone base. The needle weighs 49 grams. It is placed at the surface of the shortening, released and allowed to fall for 5 seconds. The distance of fall during this time interval is measured in tenths of millimeters. Satisfactory compositions according to the invention have fluidity index of not less about 540 as measured by the test described.

My invention is further illustrated by the following examples:

EXAMPLE 1

Five fluid shortening compositions were prepared by suspending 5% by weight of the 1 iodine value stearine of rapeseed oil (RSO), mustardseed oil (MSO), cottonseed oil (CSO), soybean oil (SBO), or palm oil (PO) in each of five respective portions of winterized cottonseed oil. Samples of each composition were stored for one week at 50° F., 70° F., and 95° F., and examined for fluidity. All of the samples retained good fluidity at 50° F. and 70° F. However the palm oil stearine composition was less satisfactory than the others due to tendency to solidify. The samples stored at 95° F. containing rapeseed oil and soybean oil stearines also retained good fluidity while the cottonseed oil stearine composition had fair to poor fluidity and the mustardseed oil and palm oil stearine compositions were unsatisfactory at this high temperature due to solidification.

EXAMPLE 2

The shortening compositions of Example 1, a liquid oil (winterized cottonseed oil) without any additive and a superglycerinated all-hydrogenated, plastic shortening ("Spry") were used to bake yellow layer cakes for which the batters were mixed by the creaming method. The batter volumes were recorded and the resulting cakes were rated as to volume, crust, grain and texture, as shown in Table I.

EXAMPLE 3

1.2% of "Myverol 18:00" (distilled monoglycerides of fully hydrogenated lard) was added to a liquid oil (winterized cottonseed oil) and to each of the compositions of Example 1. The products were stored as in Example 1 except that at 55° F. was used as the lower temperature, and examined after one week for fluidity. The liquid oil and the rapeseed oil, mustardseed oil and soybean oil stearine compositions retained good fluidity at 55° and 70° F. At 95° F. the mustardseed oil stearine composition was unsatisfactory due to solidification, while at 95° F., the other three still retained good fluidity. The cottonseed oil and palm oil stearine compositions were unsatisfactory at all three temperatures.

EXAMPLE 4

The shortening compositions of Example 3 were used to bake yellow layer cakes for which the batters were mixed by the creaming method and data obtained as in Example 2. The results are shown in Table II.

*Table II*

| Winterized cottonseed oil, percent | Stearine kind, percent | Myverol 18:00, percent | Batter Volume, cc./g. | Cake Volume, cc. | Crust | Grain | Texture |
|---|---|---|---|---|---|---|---|
| 98.8 | none | 1.2 | .89 | 1,045 | tough | uneven, open | hard. |
| 93.8 | RSO-5 | 1.2 | 1.31 | 1,165 | tender | even, slightly open | soft. |
| 93.8 | MSO-5 | 1.2 | 1.38 | 1,210 | do | do | Do. |
| 93.8 | CSO-5 | 1.2 | 1.03 | 1,120 | slightly tough | uneven, open | hard. |
| 93.8 | SBO-5 | 1.2 | .96 | 1,060 | tough | do | Do. |
| 93.8 | PO-5 | 1.2 | 1.10 | 1,155 | slightly tough | uneven, slightly open | medium hard. |

From this table it can be seen that with a monoglyceride emulsifier present, only the rapeseed oil and mustardseed oil stearine compositions were satisfactory, while the liquid composition was less satisfactory than when no emulsifier was present. The emulsifier showed synergistic improvement with stearines of the invention to the extent

*Table I*

| Winterized cottonseed oil, percent | Stearine kind, percent | Batter Volume, cc./g. | Cake Volume, cc. | Crust | Grain | Texture |
|---|---|---|---|---|---|---|
| "Spry" | | 1.23 | 1,210 | tender | even, very slightly open. | soft. |
| 100 | none | .99 | 1,060 | tough | even, open | hard. |
| 95 | RSO-5 | 1.01 | 1,045 | slightly tough | uneven, open | medium soft. |
| 95 | MSO-5 | 1.15 | 1,120 | medium tender | even, slightly open | soft. |
| 95 | CSO-5 | 0.94 | 1,000 | tough | uneven, open | medium hard. |
| 95 | SBO-5 | 0.96 | 1,000 | do | do | Do. |
| 95 | PO-5 | 1.05 | 1,080 | slightly tough | do | medium soft. |

From this table it can be noted that the mustardseed oil stearine composition most closely approached the cake making performance of the superglycerinated plastic shortening. The rapeseed oil stearine and palm oil stearine compositions also yielded acceptable cakes, while the cottonseed and soybean oil stearine compositions yielded cakes with the lowest batter and cake volumes having tough crusts and textures on the hard side. The liquid oil, although it yielded an acceptable cake volume in this instance, resulted in a tough, hard cake. Since as shown in Example 1 the palm oil stearine composition was the least stable of the stearine compositions at 50° and 70° F., the rapeseed and mustardseed oil compositions combine fluid stability and cake making effectiveness to the highest degree of the compositions tested.

that they produced cakes closely approaching the "Spry" cake reported in Table I. It also showed some synergism as to batter and cake volumes with the cottonseed oil and palm oil stearines but yielded unsatisfactory cakes, as did the liquid oil and soybean oil stearine compositions.

EXAMPLE 5

The first two compositions shown in Table II were again prepared and used to make yellow cakes by the creaming method with 1.2% of "Myverol 18:85" (distilled monoglycerides of cottonseed oil) substituted for "Myverol 18:00." Both compositions retained good fluidity when samples were stored for one week at 55° F., 70° F. and 95° F. The cake scores are shown in Table III.

Table III

| Winterized cottonseed oil, percent | Stearine kind, percent | Myverol 18:85, percent | Batter Volume, cc./g. | Cake Volume, cc. | Crust | Grain | Texture |
|---|---|---|---|---|---|---|---|
| 98.8 | none | 1.2 | .91 | 1,005 | tough | uneven, open | hard. |
| 93.8 | RSO-5 | 1.2 | 1.19 | 1,140 | slightly tough | slightly uneven, very slightly open. | soft. |

EXAMPLE 6

White cakes were prepared by the blending method using as shortening compositions liquid oil containing 1.2% of "Myverol 18:00," and 5% of 1, 13 and 27 iodine value rapeseed oil stearines, 5% of 1, 15, and 30 iodine value mustardseed oil stearines, 1 and 28 iodine value soybean oil stearines, 1 and 30 iodine value cottonseed oil stearines, and 1 and 26 iodine value palm oil stearines, as well as a sample of the liquid oil with 1.2% of "Myverol 18:00" and without any stearine additive. The same cake was also made with "Spry." The resulting cakes were scored as shown in Table IV.

It will be noted from this table that all of the compositions of this invention yielded cakes substantially equal to the "Spry" cake, whereas none of the other compositions tested yielded cakes having as desirable properties.

Table IV

| Winterized cottonseed oil, Percent | Stearine kind, Percent | Myverol 18:00, Percent | Batter Volume, cc./g. | Cake Volume, cc. | Crust | Grain | Texture |
|---|---|---|---|---|---|---|---|
| 98.8 | none | 1.2 | .86 | 1,000 | tough | even, open | hard. |
| 93.8 | 1 I. V. RSO-5 | 1.2 | .95 | 1,030 | tender | even, close | soft. |
| 93.8 | 13 I. V. RSO-5 | 1.2 | .92 | 1,030 | do | do | Do. |
| 93.8 | 27 I. V. RSO-5 | 1.2 | .94 | 1,030 | do | do | Do. |
| 93.8 | 1 I. V. MSO-5 | 1.2 | .95 | 1,045 | do | do | Do. |
| 93.8 | 15 I. V. MSO-5 | 1.2 | .94 | 1,050 | do | do | Do. |
| 93.8 | 30 I. V. MSO-5 | 1.2 | .97 | 1,045 | do | do | Do. |
| 93.8 | 1 I. V. SBO-5 | 1.2 | .87 | 1,005 | slightly tough | even, very slightly open. | medium hard. |
| 93.8 | 28 I. V. SBO-5 | 1.2 | .88 | 990 | do | do | Do. |
| 93.8 | 1 I. V. CSO-5 | 1.2 | .91 | 1,020 | do | even, close | Do. |
| 93.8 | 30 I. V. CSO-5 | 1.2 | .91 | 1,030 | do | do | Do. |
| 93.8 | 1 I. V. PO-5 | 1.2 | .94 | 1,015 | do | even, very slightly open. | Do. |
| 93.8 | 26 I. V. PO-5 | 1.2 | .90 | 1,015 | do | do | Do. |
| Spry | | | 1.17 | 1,060 | tender | even, close | soft. |

Storage tests on the rapeseed oil and the mustardseed oil stearine compositions used in this example showed that all retained satisfactory fluidity at 55° F., 70° F. and 90° F. except the 1 I. V. mustardseed oil stearine which showed tendency to solidify after one week at 90° F. However, the 15 and 30 I. V. mustardseed oil stearine compositions were of satisfactory fluidity after one week at any of the three temperatures.

EXAMPLE 7

To test the effect of varying the percentage of the stearines of the invention in fluid shortenings, shortening compositions were prepared containing 1, 2, 3, 4, 5, 6, 7 and 8%, respectively, 1 I. V. rapeseed oil stearine, 1.2% "Myverol 18:00," and the balance winterized cottonseed oil. Upon storage as in Example 1 it was found that all of the samples retained good fluidity at all three temperatures, but the samples containing 6, 7 and 8% of the stearine were not quite as good in this respect at 50° F. as were the samples with 1, 2, 3, 4 and 5%. All eight compositions were used to prepare yellow cakes by the creaming method. The cakes were scored as in Table V.

Table V

| Winterized cottonseed oil, percent | Stearine kind, percent | Myverol 18:00, percent | Batter Volume, cc./g. | Cake Volume, cc. | Crust | Grain | Texture |
|---|---|---|---|---|---|---|---|
| 97.8 | RSO-1 | 1.2 | .90 | 1,000 | tough | uneven, open | hard. |
| 96.8 | RSO-2 | 1.2 | .98 | 1,005 | do | do | Do. |
| 95.8 | RSO-3 | 1.2 | 1.07 | 1,095 | medium tender | slightly uneven, open | Do. |
| 94.8 | RSO-4 | 1.2 | 1.12 | 1,115 | tender | even, slightly open | soft. |
| 93.8 | RSO-5 | 1.2 | 1.31 | 1,165 | do | do | Do. |
| 92.8 | RSO-6 | 1.2 | 1.35 | 1,195 | do | do | Do. |
| 91.8 | RSO-7 | 1.2 | 1.32 | 1,130 | do | do | Do. |
| 90.8 | RSO-8 | 1.2 | 1.33 | 1,170 | do | do | Do. |

EXAMPLE 8

A fluid shortening was prepared having the following composition:

| | |
|---|---|
| Winterized cottonseed oil | 85.8 |
| Rapeseed oil stearine (1 I. V.) | 2.5 |
| Mustardseed oil stearine (30 I. V.) | 2.5 |
| Beta phase soybean oil stearine (1 I. V.) | 8.0 |
| "Myverol 18:00" | 1.2 |
| | 100.0 |

The composition had a fluidity above 50° F. substantially greater than could be measured by the standard method. By cooling to 35° F., which decreased penetration and fluidity, the penetration was decreased to 540 at which point it was still pourable, but quite viscous. Samples of this composition were stored at temperatures from 50° F. to 110° F. for a three months' period and remained fluid. The composition yielded excellent white and yellow cakes, substantially equal to those obtained with an all-hydrogenated superglycerinated plastic shortening, when used in baking.

EXAMPLE 9

The concentrates of mono- and di-erucyl glycerides obtained from rapeseed oil by the Hilditch method referred to above were hydrogenated to 1 I. V. and found to have saponification values of 179.0 and 174.3, respectively. The original rapeseed oil had a saponification value of 177.5 which would correspond to about 176.5 after hydrogenation. Since the difference in saponification values between monobeheno distearo glyceride and dibeheno monostearo glyceride is 10 points, each point change from the 176.5 of hydrogenated rapeseed corresponds to about a 10% concentration of the glyceride in question. Thus, based on the original composition reported by Hilditch, the fraction with the higher saponification value contained about 60% mono beheno distearo glyceride while the other concentrate contained about 80% of the dibeheno monostearo glyceride. Fluid shortening formulations were made containing 5% of each of these fractions and 1.2% "Myverol 18:00" in cottonseed salad oil. After 10 days' storage at 50° F. and 70° F., both formulations were fluid. At 95° F. the one containing the fraction high in dibehenyl glycerides was rated fair and the monobehenyl composition good in fluidity. At 110° F. the formulation containing the dibehenyl glycerides was solid while that containing predominantly monobehenyl glycerides as the active component was still fluid. The following baking data were obtained.

| Formula | Cake Mixture | Batter Volume, cc./g. | Cake Volume, cc. | Crust | Grain | Texture |
|---|---|---|---|---|---|---|
| A | Creaming Method | 1.17 | 1,110 | Tender | Even, slightly open | Soft. |
| B | Yellow Layer Cake | 1.26 | 1,160 | do | Do | Do. |
| A | Blending Method | 0.89 | 1,095 | Slightly tough | Uneven, open | Med. |
| B | Yellow Layer Cake | 0.93 | 1,130 | Med. tender | Even, slightly open | Soft. |
| A | Blending Method | 0.88 | 1,020 | Tender | Even, close | Soft. |
| B | White Layer Cake | 0.93 | 1,035 | do | do | Do. |

"A" contained the dibehenyl triglyceride.
"B" contained the monobehenyl triglyceride.

From the foregoing, the monobehenyl exhibited superior cake-baking properties than the dibehenyl triglycerides.

The blending method designated above for testing cake-making capacity was carried out as follows:

| Formula | Yellow Cake | | White Cake | |
|---|---|---|---|---|
| | Grams | Volume | Grams | Volume |
| Flour—"Softasilk" | 200 | 2 cups | 200 | 2 cups. |
| Sugar—"Fruit-Fine" | 265 | 1¼ cups | 250 | 1¼ cups. |
| Baking Powder—"Calumet" | 10 | 2½ Tsp | 14 | 3½ Tsp. |
| Salt | 4 | 1 Tsp | 4 | 1 Tsp. |
| Shortening | 100 | ½ cup | 100 | ½ cup. |
| Whole Milk | 210 | 1 cup less 2 tbsp. | 210 | 1 cup less 2 tbsp. |
| Eggs (fresh) | 100 | 2 (whole) | 90 | 3 egg whites. |
| Vanilla | 6 | 1½ Tsp | 6 | 1½ Tsp. |

Sift flour, sugar, baking powder and salt into mixing bowl. Add shortening, vanilla and two-thirds of the milk. Beat 2 minutes in electric mixer (Sunbeam "Mixmaster") at No. 4 speed. Scrape bowl and beater with "Spry" spatula. Add eggs and remaining milk and mix 2 minutes at No. 4 speed. Again scrape and mix. Take batter volume. Scale 14 oz. or split batter into each of two paper-lined and greased 8" layer cake tins. Bake yellow cakes at 375° F. for 24 minutes, 22 minutes at 360° F. for white cakes. Take cake volumes by standard method and score the day after the cakes are baked.

The creaming method for making test cakes was carried out as follows:

| Formula | Grams | Volume Measure |
|---|---|---|
| Flour—"Softasilk" | 200 | 2 cups. |
| Sugar—"Fruit-Fine" | 200 | 1 cup. |
| Baking Powder—"Calumet" | 10 | 2½ Tsp. |
| Salt | 3 | ¾ Tsp. |
| Shortening | 100 | ½ cup. |
| Whole Milk | 180 | ¾ cup. |
| Eggs (fresh) | 100 | 2 (whole). |
| Vanilla | 4 | 1 Tsp. |

Cream sugar, salt and shortening 2 minutes in electric mixer (Sunbeam "Mixmaster") on No. 4 setting. Scrape bowl and add eggs. Mix 2 minutes on No. 4 setting. Scrape bowl. Add one-half of the milk, then sifted flour and baking powder and mix smooth. Add balance of milk, flour and mix 1½ minutes. Take batter volume. Scale 380 grams into two 8" greased layer cake pans. Bake approximately 23 minutes at 375° F. Take cake volume and score the day after cakes are baked.

Other variations and modifications of the invention will be apparent to those skilled in the art and the invention contemplates all such variations and modifications which come within the scope of the appended claims.

I claim:

1. A stable fluid shortening composition comprising a salad oil and a stearine containing triglycerides having at least one benhenyl group per molecule and having an iodine value not greater than 30, the stearine being present in the composition in an amount sufficient to provide the composition with from about 3% to about 8% by weight of the composition of triglycerides having at least one behenyl group per molecule.

2. A composition according to claim 1 in which said stearine is in the form of a fine substantially non-settling suspension in said oil.

3. A composition according to claim 1 having 4 to 6% of said stearine.

4. A composition according to claim 1 containing 0.5 to 5.0% of an emulsifying agent.

5. A composition according to claim 4 in which said emulsifying agent is of the group consisting of mono and diglycerides and mixtures thereof of fatty acids.

6. A composition according to claim 5 in which said fatty acid is saturated.

7. A composition according to claim 6 in which said emulsifying agent is a lard stearine distilled monoglyceride.

8. A composition according to claim 6 in which said emulsifying agent consists essentially of mixed monoglycerides of fatty acids of a liquid oil.

9. A composition according to claim 8 in which said liquid oil is cottonseed oil.

10. A composition according to claim 4 in which said stearine is a stearine of mustard seed oil.

11. A composition according to claim 4 in which said stearine is a stearine of rapeseed oil.

12. A stable fluid shortening composition comprising an edible liquid oil and about 3 to 8% by weight based on the composition of a saturated long chain fatty acid trigylceride having at least one behenyl radical per molecule.

13. A composition according to claim 12 in which said triglyceride is dispersed in said oil in particle size small enough so that the composition is substantially non-settling.

14. A composition according to claim 12 in which the major portion of said triglyceride contains not more than 2 behenyl radicals per molecule.

15. A composition according to claim 12 in which the major portion of said triglyceride contains 1 behenyl radical per molecule.

16. A stable fluid shortening composition comprising an edible liquid oil and a stearine containing triglycerides having at least one behenyl group per molecule and having an iodine value not greater than 30, the stearine being present in the composition in an amount sufficient to provide the composition with from about 3% to about 8% by weight of the composition of triglycerides having at least one behenyl group per molecule.

17. A stable fluid shortening composition comprising a salad oil, 0.5 to 5.0% of an emulsifying agent, from 1% to about 8% of soybean oil stearine having an iodine value of 1 to 22, and an additional stearine containing triglycerides having an iodine value not greater than 30 and having at least one behenyl group per molecule, the said additional stearine being present in the composition in an amount sufficient to provide from about 3% to about 8% by weight of the composition of triglycerides having at least one behenyl group per molecule.

18. A composition according to claim 17 in which said stearines consist essentially of substantially equal quantities of rapeseed and mustardseed oil stearines, and said emulsifying agent is a lard stearine distilled monoglyceride.

19. A composition according to claim 12 containing 0.5 to 5.0% of an emulsifying agent.

20. A composition according to claim 19 in which said emulsifying agent is of the group consisting of mono- and diglycerides and mixtures thereof of fatty acids.

References Cited in the file of this patent

UNITED STATES PATENTS

| | | |
|---|---|---|
| 2,132,687 | Harris | Oct. 11, 1938 |
| 2,442,532 | Eckey | June 1, 1948 |
| 2,508,393 | Jaeger | May 23, 1950 |
| 2,521,242 | Mitchell | Sept. 5, 1950 |
| 2,532,523 | Trempert et al. | Dec. 5, 1950 |
| 2,615,160 | Baur | Oct. 21, 1952 |
| 2,666,705 | Glabe | Jan. 19, 1954 |